(12) United States Patent
Bade et al.

(10) Patent No.: US 8,086,852 B2
(45) Date of Patent: *Dec. 27, 2011

(54) PROVIDING A TRUSTED PLATFORM MODULE IN A HYPERVISOR ENVIRONMENT

(75) Inventors: Steven A. Bade, Georgetown, TX (US); Ryan Charles Catherman, Raleigh, NC (US); James Patrick Hoff, Raleigh, NC (US); Nia Letise Kelley, Austin, TX (US); Emily Jane Ratliff, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/207,487

(22) Filed: Sep. 9, 2008

(65) Prior Publication Data

US 2009/0006843 A1 Jan. 1, 2009

Related U.S. Application Data

(63) Continuation of application No. 10/835,350, filed on Apr. 29, 2004, now Pat. No. 7,484,091.

(51) Int. Cl.
*H04L 9/00* (2006.01)
(52) U.S. Cl. .......................................... 713/164; 726/26
(58) Field of Classification Search .................. 713/163, 713/164, 165; 726/25, 26
See application file for complete search history.

(56) References Cited

U.S. PATENT DOCUMENTS

| 6,678,833 | B1 | 1/2004 | Grawrock |
| 6,948,065 | B2 * | 9/2005 | Grawrock ..................... 713/168 |
| 7,023,459 | B2 | 4/2006 | Arndt et al. |

(Continued)

FOREIGN PATENT DOCUMENTS

JP 2000259434 9/2000

(Continued)

OTHER PUBLICATIONS

IBM, Logical Partition Security in the IBM @server pSeries 690, Feb. 15, 2002, IBM, first edition, 1-9 pages http://www-03.ibm.com/systems/p/hardware/whitepapers/lpar_security.pdf, Retrieved date: Feb. 15, 2008.*

(Continued)

*Primary Examiner* — Samson Lemma
(74) *Attorney, Agent, or Firm* — Matthew B. Talpis; Jack V. Musgrove

(57) ABSTRACT

A method is presented for implementing a trusted computing environment within a data processing system. A hypervisor is initialized within the data processing system, and the hypervisor supervises a plurality of logical, partitionable, runtime environments within the data processing system. The hypervisor reserves a logical partition for a hypervisor-based trusted platform module (TPM) and presents the hypervisor-based trusted platform module to other logical partitions as a virtual device via a device interface. Each time that the hypervisor creates a logical partition within the data processing system, the hypervisor also instantiates a logical TPM within the reserved partition such that the logical TPM is anchored to the hypervisor-based TPM. The hypervisor manages multiple logical TPM's within the reserved partition such that each logical TPM is uniquely associated with a logical partition.

15 Claims, 4 Drawing Sheets

U.S. PATENT DOCUMENTS

| | | | |
|---|---|---|---|
| 7,096,469 | B1 | 8/2006 | Kubala et al. |
| 7,137,004 | B2 * | 11/2006 | England et al. ............... 713/176 |
| 2004/0073806 | A1 | 4/2004 | Zimmer |
| 2004/0205362 | A1 | 10/2004 | Catherman et al. |
| 2005/0086509 | A1 * | 4/2005 | Ranganathan ................ 713/200 |
| 2005/0137889 | A1 | 6/2005 | Wheeler |
| 2006/0026693 | A1 | 2/2006 | Bade et al. |
| 2006/0130060 | A1 * | 6/2006 | Anderson et al. ................ 718/1 |

FOREIGN PATENT DOCUMENTS

| | | |
|---|---|---|
| JP | 2002041306 | 2/2002 |
| WO | 03090074 | 10/2003 |

OTHER PUBLICATIONS

Komori, Tetsuro, "Chapter 3 LPAR Summary", AIX: LPAR and AIX 5L version 5.2, first edition, pp. 53-64 (Nov. 25, 2003).

* cited by examiner

PROVIDING A TRUSTED PLATFORM MODULE IN A HYPERVISOR ENVIRONMENT

CROSS-REFERENCE TO RELATED APPLICATION

This application is a continuation of U.S. patent application Ser. No. 10/835,350 filed Apr. 29, 2004, now U.S. Pat. No. 7,484,091.

BACKGROUND OF THE INVENTION

1. Field of the Invention

The present invention relates to an improved data processing system and, in particular, to a method and apparatus for data storage protection using cryptography.

2. Description of the Related Art

Most data processing systems contain sensitive data and sensitive operations that need to be protected. For example, the integrity of configuration information needs to be protected from illegitimate modification, while other information, such as a password file, needs to be protected from illegitimate disclosure. As another example, a data processing system needs to be able to reliably identify itself to other data processing systems.

An operator of a given data processing system may employ many different types of security mechanisms to protect the data processing system. For example, the operating system on the data processing system may provide various software mechanisms to protect sensitive data, such as various authentication and authorization schemes, while certain hardware devices and software applications may rely upon hardware mechanisms to protect sensitive data, such as hardware security tokens and biometric sensor devices.

The integrity of a data processing system's data and its operations, however, centers around the issue of trust. A data processing system's data and operations can be verified or accepted by another entity if that entity has some manner for establishing trust with the data processing system with respect to particular data items or particular operations.

Hence, the ability to protect a data processing system is limited by the manner in which trust is created or rooted within the data processing system. To address the issues of protecting data processing systems, a consortium of companies has formed the Trusted Computing Group (TCG) to develop and to promulgate open standards and specifications for trusted computing. According to the specifications of the Trusted Computing Group, trust within a given data processing system or trust between a data processing system and another entity is based on the existence of a hardware component within the data processing system that has been termed the trusted platform module (TPM).

A trusted platform enables an entity to determine the state of the software environment in that platform and to seal data to a particular software environment in that platform. The entity deduces whether the state of the computing environment in that platform is acceptable before performing a transaction with that platform. To enable this, the trusted platform provides integrity metrics, also known as integrity measurements, to the entity that reflects the integrity of the software state of the trusted platform, and the integrity measurements require a root of trust within the computing platform. In order for a system to be a trusted platform, the integrity measurements must be taken from the Core Root of Trust for Measurements and extended through the initial program load (IPL) process up to the point at which the operating system is initialized.

A trusted platform module has been generally described in a platform-independent manner, but platform-specific descriptions have been created for certain classes of systems, such as personal computers (PC's). Existing hardware for trusted computing has focused on implementations for a single trusted platform module for a single system. This situation is sufficient for simple servers and PC's, which tend to be relatively low-performance computers that meet the needs of stand-along computational environments or client-side processing environments.

High-performance servers, though, support partitionable, multithreaded environments that may need access to a trusted platform module on multiple threads simultaneously. In order to fulfill the needs of such environments, the trusted platform module must also provide high-performance. Therefore, it would be advantageous to have a mechanism for enabling a high-performance trusted platform module in a partitionable environment.

SUMMARY OF THE INVENTION

A method, an apparatus, and a computer program product are presented for implementing a trusted computing environment within a data processing system. A hypervisor is initialized within the data processing system, and the hypervisor supervises a plurality of logical, partitionable, runtime environments within the data processing system. The hypervisor reserves a logical partition for a hypervisor-based trusted platform module (TPM) which provides integrity measurements for a software state of the data processing system, and presents the hypervisor-based trusted platform module to other logical partitions as a virtual device via a device interface. Each time that the hypervisor creates a logical partition within the data processing system, the hypervisor also instantiates a logical TPM within the reserved partition such that the logical TPM is anchored to the hypervisor-based TPM. The hypervisor manages multiple logical TPM's within the reserved partition such that each logical TPM is uniquely associated with a logical partition.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DESCRIPTION OF THE PREFERRED EMBODIMENT(S)

In general, the devices that may comprise or relate to the present invention include a wide variety of data processing technology. Therefore, as background, a typical organization of hardware and software components within a distributed data processing system is described prior to describing the present invention in more detail.

Figure 1A:
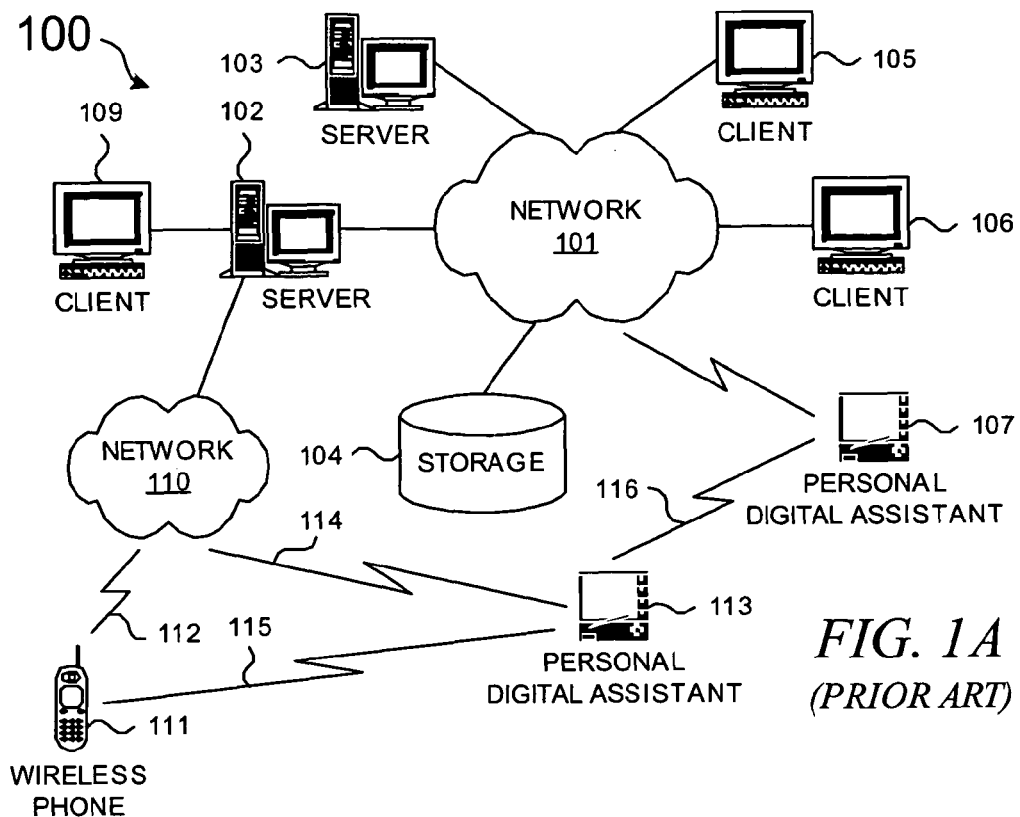
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

Figure 1B:
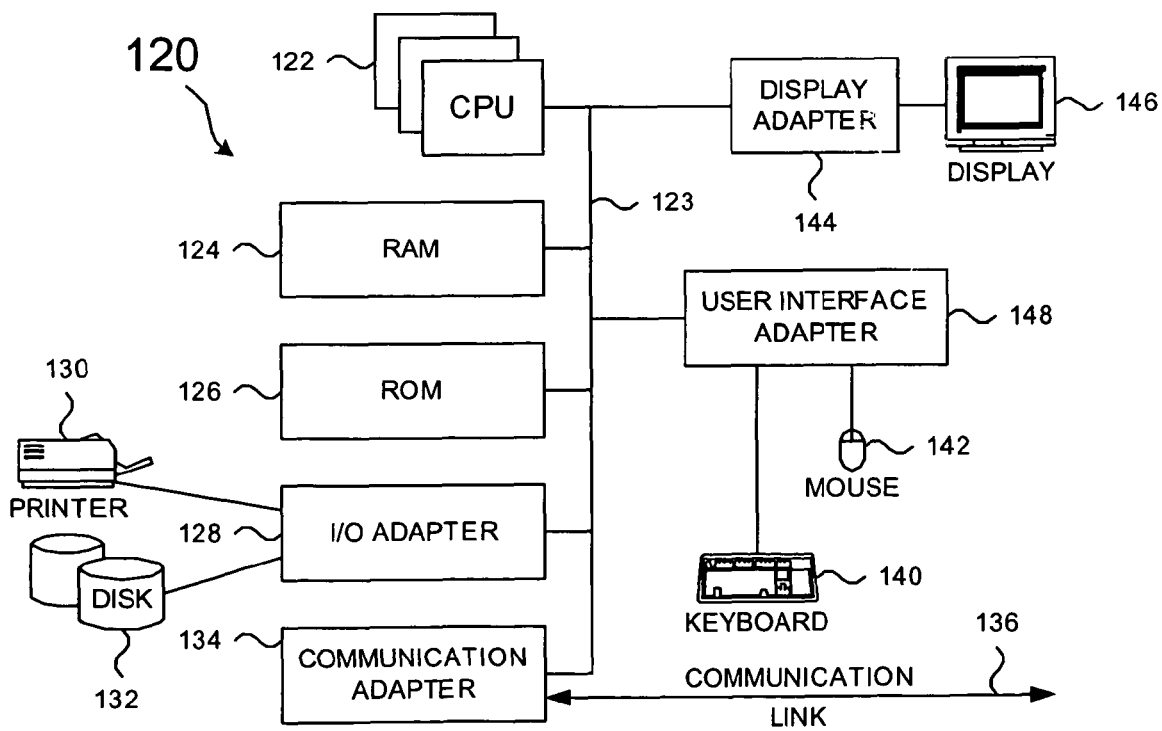
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

Figure 1C:
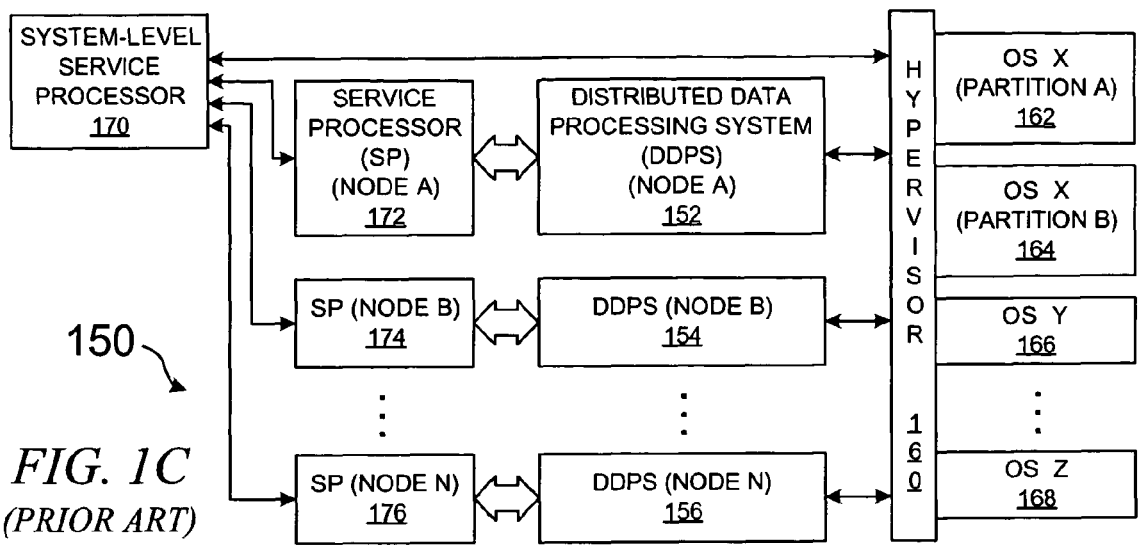
FIG. 1C depicts a block diagram that shows an example of a prior art distributed data processing system.

With reference now to FIG. 1C, a block diagram depicts an example of a prior art distributed data processing system. Distributed data processing system 150 contains multiple nodes 152-156, each of which may represent a single-processor or multi-processor device or card connected to a communication switch or a network; nodes 152-156 may be implemented as central electronic complex (CEC) units. Hypervisor 160 supports multiple instances of one or more operating systems and/or operating system partitions 162-168 on the shared computational resources of the distributed data processing nodes of system 150. Hypervisor 160 communicates with system-level service processor 170, which is responsible for booting system 150 and for monitoring the availability of the shared resources. Each distributed data processing node is associated with a service processor, e.g., service processors 172-176, each of which is responsible for booting its associated node and for assisting system-level service processor 170 in monitoring each of the nodes; a service processor may be associated with a node through a variety of physical connections to its associated node, e.g., the service processor's hardware card may attach to a PCI bus. It should be noted that each node may have a plurality of service processors, although only one service processor would be responsible for booting its associated node.

The present invention could be implemented on a variety of hardware platforms and computational environments; FIG. 1A, FIG. 1B, and FIG. 1C are intended as examples of a heterogeneous computing environment and not as architectural limitations for the present invention. In addition to being able to be implemented on a variety of hardware platforms and computational environments, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to trusted computing platforms. Before describing the present invention in more detail, though, some background information about trusted computing platforms is provided in FIG. 2 and FIG. 3 for evaluating the operational efficiencies and other advantages of the present invention. Although the present invention may be implemented in conjunction with a variety of trusted computing platforms, possibly in accordance with one or more standards, the examples of the present invention hereinbelow employ the terminology and examples from the standards and/or specifications that have been promulgated by the Trusted Computing Group (TCG); it should be noted, though, that the examples are not meant to imply architectural, functional, nor definitional limitations with respect to embodiments of the present invention.

Figure 2:
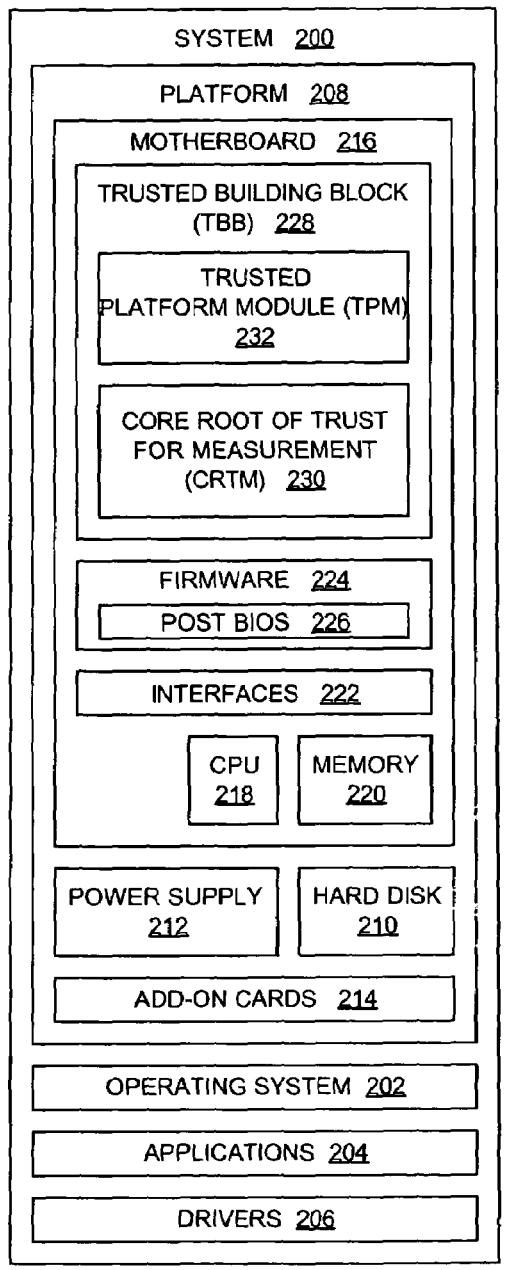
FIG. 2 depicts a block diagram that shows an example of a typical trusted platform architecture.

With reference now to FIG. 2, a block diagram depicts some of the components in a data processing system that is constructed using a model of a trusted platform architecture. Trusted platform architectures may be implemented for particular computational environments or for particular classes of devices; FIG. 2 depicts a trusted platform architecture in accordance with the TCG's PC-specific implementation specification.

System 200 supports execution of software components, such as operating system 202, applications 204, and drivers 206, on its platform 208. The software components may be received through a network, such as network 101 that is shown in FIG. 1A, or they may be stored, e.g., on hard disk 210. Platform 208 receives electrical power from power supply 212 for executing the software components on add-on cards 214 and motherboard 216, which includes typical components for executing software, such as CPU 218 and memory 220, although motherboard 216 may include multiple CPU's. Interfaces 222 connect motherboard 216 to other hardware components within system 200, and firmware 224 contains POST BIOS (power-on self-test basic input/output system) 226.

Motherboard 216 also comprises trusted building block (TBB) 228; motherboard 216 is supplied by a manufacturer with TBB 228 and other components physically or logically attached and supplied by the manufacturer. TBB 228 comprises the combination of the core root of trust for measurement (CRTM) component 230, the trusted platform module (TPM) 232, the connection of the CRTM to motherboard 216, and the connection of the TPM to motherboard 216.

TPM 232 is explained in more detail with respect to FIG. 3 hereinbelow. CRTM 230 is an immutable portion of the platform's initialization code that executes upon a platform reset; the platform's execution must begin at the CRTM upon any platform reset event. In this manner, the trust in the platform is based on the CRTM and the behavior of the TPM, and the trust in all measurements is based on the integrity of the CRTM. In the example that is shown in FIG. 2, the BIOS may be assumed to include a BIOS Boot Block and POST BIOS 226; each of these are independent components that can be updated independent of each other, wherein the manufacturer must control the update, modification, and maintenance of the BIOS Boot Block, but a third party supplier may update, modify, or maintain the POST BIOS component. In the example that is shown in FIG. 2, the CRTM may be assumed to be the BIOS Boot Block, and the POST BIOS is a measured component of the chain of trust. Alternatively, the CRTM may comprise the entire BIOS.

Figure 3:
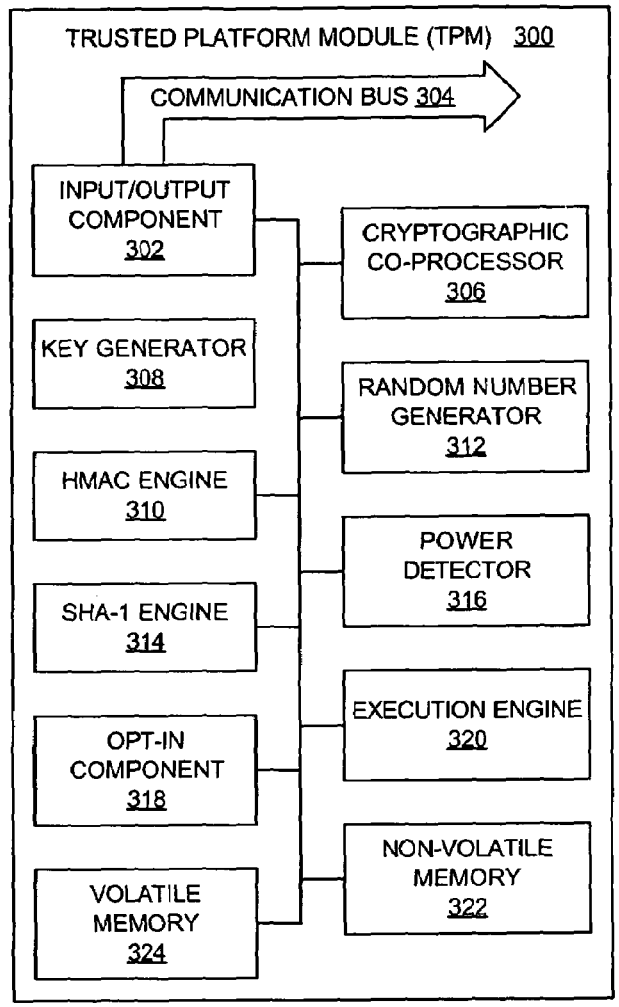
FIG. 3 depicts a block diagram that shows some of the major components of a typical trusted platform module.

With reference now to FIG. 3, a block diagram depicts some of the major components of a trusted platform module according to TCG specifications. Trusted platform module 300 comprises input/output component 302, which manages information flow over communications bus 304 by performing appropriate protocol encoding/decoding operations and routing of messages to appropriate components. Cryptographic co-processor 306 performs cryptographic operations within a trusted platform module. Key generator 308 creates symmetric keys and RSA asymmetric cryptographic key pairs. HMAC engine 310 performs HMAC (Keyed-Hashing for Message Authentication) calculations, whereby message authentication codes are computed using secret keys as integrity checks to validate information transmitted between two parties, e.g., in accordance with Krawczyk et al., "HMAC: Keyed-Hashing for Message Authentication", Request for Comments (RFC) 2104, Internet Engineering Task Force (IETF), February 1997.

Random number generator 312 acts as a source of randomness for the computation of various values, such as nonces, keys, or other values. SHA-1 engine 314 implements the SHA-1 hash algorithm. Power detector 316 manages the power states of a trusted platform module in association with the power states of the platform. Opt-in component 318 maintains the state of persistent and volatile flags and enforces semantics associated with those flags such that the trusted platform module may be enabled and disabled. Execution engine 320 runs program code to execute commands that the trust platform module receives through input/output component 302. Non-volatile memory 322 stores persistent identity and state associated with the trusted platform module; the non-volatile memory may store static data items but is also available for storing dynamic data items by entities that are authorized by the trusted platform module owner, whereas volatile memory 324 stores dynamic data items.

Given the background information on trusted computing platforms that has been described with respect to FIG. 2 and FIG. 3, a detailed description of the present invention is provided hereinbelow with respect to the remaining figures. As noted above, typical trusted platforms have been designed such that a single trusted platform module exists within a trusted platform architecture, which would require unacceptable restrictions in a high-performance server or similar distributed data processing system, such as system 150 that is shown in FIG. 1C. On the other hand, high-performance servers support partitionable, multithreaded environments that need efficient use and sharing resources. The present invention addresses this problem by providing a mechanism for enabling a virtualized trusted platform module in a partitionable environment, as explained in more detail hereinbelow, whereby an embodiment of the present invention allows virtualization of a trusted platform module in software or in hardware that is not virtualizable in itself.

Figure 4A:
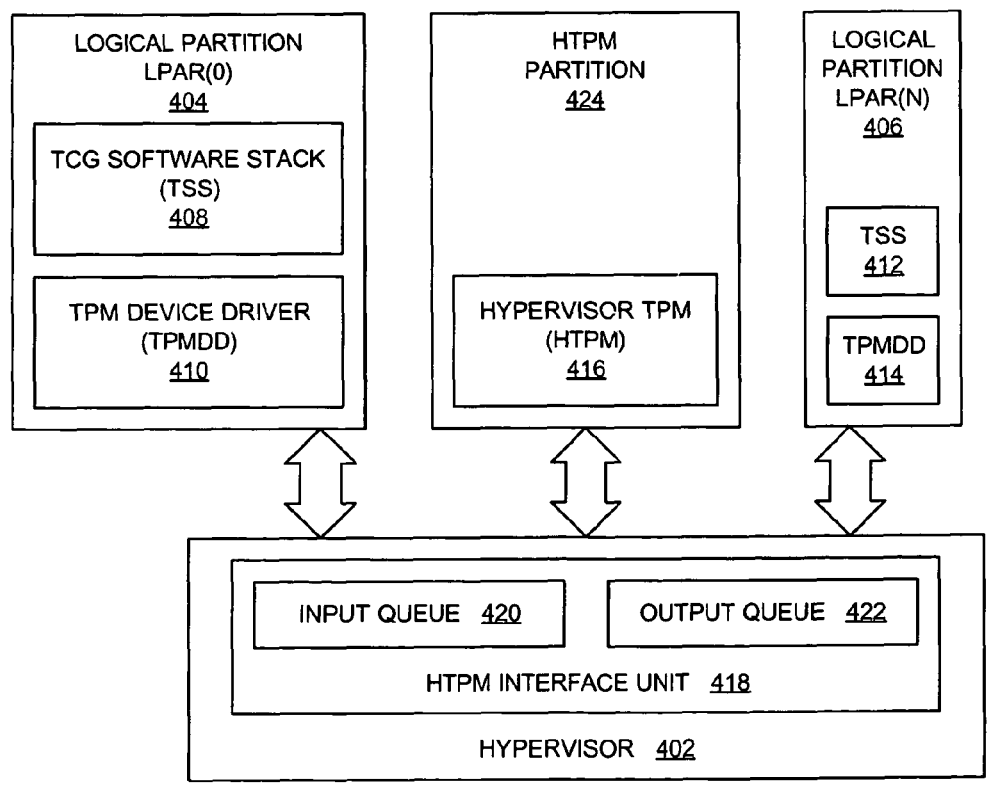
FIG. 4A depicts a block diagram that shows a logical organization for a high-performance trusted platform module in a hypervisor-based execution environment within a data processing system.

With reference now to FIG. 4A, a block diagram depicts a logical organization for a high-performance trusted platform module in a hypervisor-based execution environment within a data processing system in accordance with an embodiment of the present invention. Data processing system 400 contains a hypervisor 402 that supports multiple instances of one or more operating systems and/or logical partitions (LPAR's) 404 and 406 on the shared computational resources of data processing system 400. LPAR 404 contains TCG software stack (TSS) 408 and TPM device driver (TPMDD) 410, while LPAR 406 contains TSS 412 and TPMDD 414. TSS 408 and TSS 412 implement the specification of the host programming interfaces that an operating system, an application, or other software component utilizes to interface with a TPM. TSS comprises: the TSS service provider, to which an entity may interface via common application programming interfaces (API's); the TSS core services, which provides centralized management of key storage, contexts, and handles the direct interaction with the TPM on the host; and the TPM device driver library and the TPMDD, such as TPMDD 410 or TPMDD 414. Generally, all interfacing to the TPM occurs through TSS service provider interface (TSPI) or an API above the TSPI.

In order to improve throughput on the TPM, the present invention presents a TPM within system 400 as a hypervisor-based TPM (HTPM) 416 that is accessed through HTPM interface unit 418 in hypervisor 402; HTPM 416 provides the functionality of a TPM for system 400.

A TPM is specified as an I/O device with operations into it being asynchronous; in the present invention, HTPM 416 is represented as a virtual I/O device, i.e., a logical I/O device. Operations to the HTPM, e.g., functional calls or requests from LPAR 404 to HTPM 416, are placed onto input queue 420, which causes a trap into hypervisor 402. Hypervisor 402 re-queues the operation to HTPM 416, where the TPM functions are performed on a first-in, first-out basis. When the TPM function is complete, HTPM 416 places the results on output queue 422, which also causes a trap into hypervisor 402; hypervisor 402 then passes the results back to the calling entity.

In an alternative embodiment, HTPM 416 could be implemented within hypervisor 402. In a preferred embodiment, HTPM 416 is managed by hypervisor 402 within a reserved logical partition, shown as HTPM partition 424, which is logically part of the hypervisor, e.g., its code is maintained as part of the certified hypervisor; the hypervisor creates the HTPM partition upon each reboot.

Managing the HTPM in a separate partition provides additional advantages. Many of the TPM operations utilize the RSA algorithm, which is computationally expensive, and the incorporation of the HTPM within the hypervisor would result in execution path lengths that would be unacceptable. Hence, by placing the HTPM within a partition, the hypervisor maintains its execution characteristics while relegating the TPM functions to a lower priority. Moreover, the placement of the HTPM in a separate partition provides the hypervisor with greater flexibility in protecting the memory that is used by the HTPM without impacting the hypervisor.

Figure 4B:
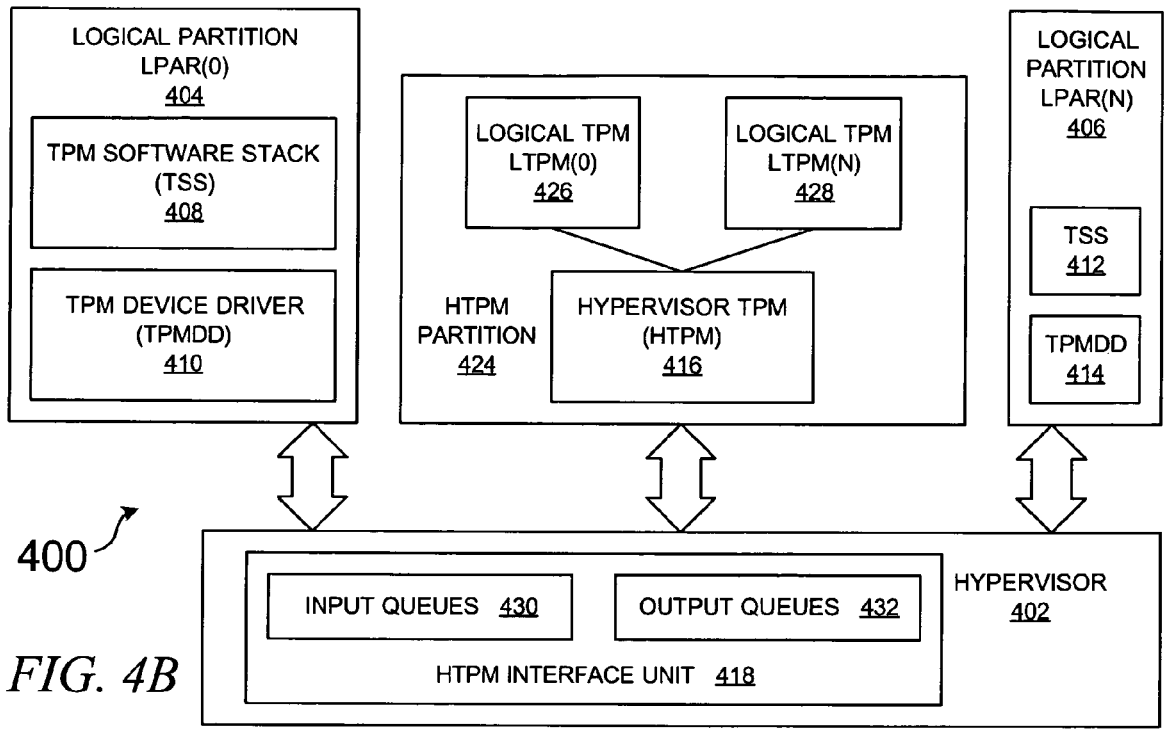
FIG. 4B depicts a block diagram that shows a logical organization for a high-performance trusted platform module that includes logical trusted platform modules in a hypervisor-based execution environment within a data processing system.

With reference now to FIG. 4B, a block diagram depicts a logical organization for a high-performance trusted platform module that includes logical trusted platform modules in a hypervisor-based execution environment within a data processing system in accordance with an embodiment of the present invention. System 400 that is shown in FIG. 4B is similar to system 400 that is shown in FIG. 4A; similar reference numerals refer to similar elements. However, HTPM partition 424 is implemented in a manner to support multiple virtualized TPM's, e.g., logical TPM (LTPM) 426 and LTPM 428. An example of an implementation of virtualized LTPM's for virtualized environments, such as logical partitions, can be found in "Method and system for virtualization of trusted platform modules", U.S. Pat. No. 7,380,119, hereby incorporated by reference. When the hypervisor creates a logical partition, the hypervisor instantiates an LTPM within the HTPM partition; when the hypervisor terminates a logical partition, the hypervisor destroys its associated LTPM. Each LPAR within system 400 is uniquely associated with an LTPM, each of which is anchored to HTPM 416. In a preferred embodiment, the LTPM's are maintained within HTPM partition 424 along with HTPM 416. HTPM interface unit 418 supports multiple input queues 430 and multiple output queues 432 such that each LTPM has an associated input queue and an associated output queue.

Figures 5A, 5B, 5C:
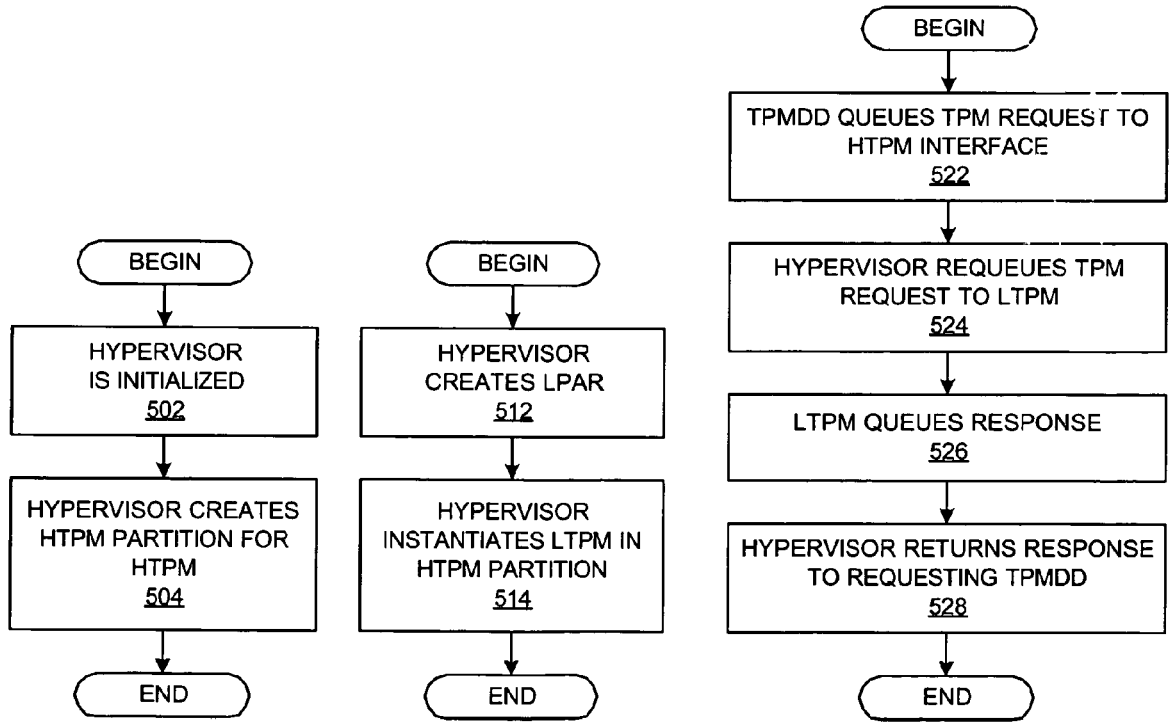
FIGS. 5A-5C depicts a set of flowcharts that show processes by which a hypervisor-based trusted platform module supports access to TPM functionality.

With reference now to FIGS. 5A-5C, a set of flowcharts depict processes by which a hypervisor-based trusted platform module supports access to TPM functionality in accordance with an embodiment of the present invention. Referring to FIG. 5A, when the hypervisor is initialized (step 502), the hypervisor creates a special, separate partition that supports the hypervisor-based trusted platform module (HTPM), i.e., an HTPM partition (step 504). Referring to FIG. 5B, at some later point in time, when the hypervisor creates a logical partition (step 512), the hypervisor instantiates a logical or virtualized trusted platform in the HTPM partition that is anchored to the HTPM (step 514). Referring to FIG. 5C, at some later point in time, when a TPM device driver is responding to a function call from a software component, the TPM device driver places a TPM functional request on the appropriate HTPM interface input queue (step 522). The hypervisor responds to the queue operation by requeuing the TPM functional request to the appropriate LTPM (step 524). When the LTPM has performed the TPM function, the LTPM places the TPM functional response on the appropriate HTPM interface output queue (step 526). The hypervisor then returns the TPM functional response to the requesting TPM device driver (step 528). Multiple simultaneous LTPM's may be actively processing requests while the hypervisor is performing other duties.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer-readable storage medium include media such as EPROM, ROM, tape, computer readable paper, floppy disc, hard disk drive, RAM, and CD-ROMs and excluding any transitory media such as propagating signals.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for implementing a trusted computing environment within a data processing system, the method comprising:

initializing a hypervisor within the data processing system, wherein the hypervisor supervises a plurality of logical, partitionable, runtime environments within the data processing system, by executing first program instructions in the data processing system;

reserving a logical partition for a hypervisor-based trusted platform module (TPM) which provides integrity measurements for a software state of the data processing system, by executing second program instructions in the data processing system; and presenting the hypervisor-based trusted platform module to logical partitions as a virtual device via a device interface, by executing third program instructions in the data processing system.

2. The method of claim 1 further comprising:

receiving from a TPM device driver in one of the logical partitions a trusted platform module functional request on an input queue of the device interface; and transferring by the hypervisor the queued TPM functional request to the hypervisor-based TPM.

3. The method of claim 1 further comprising:

receiving from the hypervisor-based TPM a trusted platform module functional response on an output queue of the device interface; and transferring by the hypervisor the queued TPM functional response to a TPM device driver in one of the logical partitions.

4. The method of claim 1 further comprising:

creating by the hypervisor a logical partition within the data processing system; and instantiating a logical TPM within the reserved partition, wherein the logical TPM is anchored to the hypervisor-based TPM.

5. The method of claim 4 further comprising:

managing multiple logical TPM's within the reserved partition such that each logical TPM is uniquely associated with a logical partition.

6. A computer program product for implementing a trusted computing environment within a data processing system, the computer program product comprising:

a computer-readable storage medium;

program instructions residing in said storage medium for initializing a hypervisor within the data processing system, wherein the hypervisor supervises a plurality of logical, partitionable, runtime environments within the data processing system;

program instructions residing in said storage medium for reserving a logical partition for a hypervisor-based trusted platform module (TPM) which provides integrity measurements for a software state of the data processing system; and program instructions residing in said storage medium for presenting the hypervisor-based trusted platform module to logical partitions as a virtual device via a device interface.

7. The computer program product of claim 6 further comprising:

program instructions residing in said storage medium for receiving from a TPM device driver in one of the logical partitions a trusted platform module functional request on an input queue of the device interface; and program instructions residing in said storage medium for transferring by the hypervisor the queued TPM functional request to the hypervisor-based TPM.

8. The computer program product of claim 6 further comprising:

program instructions residing in said storage medium for receiving from the hypervisor-based TPM a trusted platform module functional response on an output queue of the device interface; and program instructions residing in said storage medium for transferring by the hypervisor the queued TPM functional response to a TPM device driver in one of the logical partitions.

9. The computer program product of claim 6 further comprising:

program instructions residing in said storage medium for creating by the hypervisor a logical partition within the data processing system; and program instructions residing in said storage medium for instantiating a logical TPM within the reserved partition, wherein the logical TPM is anchored to the hypervisor-based TPM.

10. The computer program product of claim 9 further comprising:

program instructions residing in said storage medium for managing multiple logical TPM's within the reserved partition such that each logical TPM is uniquely associated with a logical partition.

11. An apparatus for implementing a trusted computing environment within a data processing system, the apparatus comprising:

one or more processors which process program instructions;

a memory device connected to said one or more processors;

program instructions residing in said memory device for initializing a hypervisor within the data processing system, wherein the hypervisor supervises a plurality of logical, partitionable, runtime environments within the data processing system;

program instructions residing in said memory device for reserving a logical partition for a hypervisor-based trusted platform module (TPM) which provides integrity measurements for a software state of the data processing system; and program instructions residing in said memory device for presenting the hypervisor-based trusted platform module to logical partitions as a virtual device via a device interface.

12. The apparatus of claim 11 further comprising:

program instructions residing in said memory device for receiving from a TPM device driver in one of the logical partitions a trusted platform module functional request on an input queue of the device interface; and program instructions residing in said memory device for transferring by the hypervisor the queued TPM functional request to the hypervisor-based TPM.

13. The apparatus of claim 11 further comprising:

program instructions residing in said memory device for receiving from the hypervisor-based TPM a trusted platform module functional response on an output queue of the device interface; and program instructions residing in said memory device for transferring by the hypervisor the queued TPM functional response to a TPM device driver in one of the logical partitions.

14. The apparatus of claim 11 further comprising:

program instructions residing in said memory device for creating by the hypervisor a logical partition within the data processing system; and program instructions residing in said memory device for instantiating a logical TPM within the reserved partition, wherein the logical TPM is anchored to the hypervisor-based TPM.

15. The apparatus of claim 14 further comprising:

program instructions residing in said memory device for managing multiple logical TPM's within the reserved partition such that each logical TPM is uniquely associated with a logical partition.

* * * * *